United States Patent
Tsuji et al.

(10) Patent No.: US 11,312,396 B2
(45) Date of Patent: Apr. 26, 2022

(54) VEHICLE CONTROL SYSTEM

(71) Applicant: HONDA MOTOR CO., LTD., Tokyo (JP)

(72) Inventors: Kanta Tsuji, Wako (JP); Tadashi Naruse, Wako (JP); Atsushi Ishioka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 17 days.

(21) Appl. No.: 16/831,303

(22) Filed: Mar. 26, 2020

(65) Prior Publication Data

US 2020/0307639 A1 Oct. 1, 2020

(30) Foreign Application Priority Data

Mar. 29, 2019 (JP) .............................. JP2019-067755

(51) Int. Cl.
*B60W 60/00* (2020.01)
*B60Q 5/00* (2006.01)
*B60W 10/20* (2006.01)
*B60W 10/30* (2006.01)
*B60W 30/06* (2006.01)
*B60K 28/06* (2006.01)
*G05D 1/02* (2020.01)
(Continued)

(52) U.S. Cl.
CPC ......... *B60W 60/0051* (2020.02); *B60Q 5/005* (2013.01); *B60W 10/20* (2013.01); *B60W 10/30* (2013.01); *B60W 30/06* (2013.01); *G01C 21/3407* (2013.01); *G01C 21/3679* (2013.01); *G05D 1/0214* (2013.01); *G05D 1/0231* (2013.01); *G05D 1/0255* (2013.01); *B60W 2420/42* (2013.01)

(58) Field of Classification Search
None
See application file for complete search history.

(56) References Cited

U.S. PATENT DOCUMENTS 8,232,874 B1* 7/2012 Aneiros ............. B60H 1/00657
340/438
9,599,986 B1* 3/2017 Eberbach ............. G05D 1/0061
9,868,391 B1* 1/2018 Fairfield ............... B60W 30/08
(Continued)

FOREIGN PATENT DOCUMENTS

JP 2007283809 A 11/2007
WO 2019106787 A1 6/2019

*Primary Examiner* — Todd Melton
(74) *Attorney, Agent, or Firm* — Armstrong Teasdale LLP

(57) ABSTRACT

In a vehicle control system (1) configured for autonomous driving, and having a control unit (15) configured to execute a stop process by which the vehicle is parked in a prescribed stop area when it is detected that the control unit or the driver has become incapable of properly maintaining a traveling state of the vehicle, the control unit determines if a person is present within a predetermined range from the vehicle according to information obtained by a surrounding condition acquiring unit (61), the control unit causing the external notification device (14) to generate the acoustic notification at a first notification volume when a person is present within the predetermined range, and at a second notification volume higher than the first notification volume when a person is not present within the predetermined range.

9 Claims, 5 Drawing Sheets

(51) Int. Cl.
  *G01C 21/36* (2006.01)
  *G01C 21/34* (2006.01)

(56) References Cited

U.S. PATENT DOCUMENTS

| | | |
|---|---|---|
| 10,002,535 B1* | 6/2018 | Hille ..................... B60Q 5/005 |
| 2012/0232749 A1* | 9/2012 | Schoenberg ............. B60N 2/28 |
| | | 701/36 |
| 2020/0189462 A1* | 6/2020 | Shimizu .................. B60Q 1/50 |

* cited by examiner

VEHICLE CONTROL SYSTEM

TECHNICAL FIELD

The present invention relates to a vehicle control system configured for autonomous driving.

BACKGROUND ART

Some vehicles such as electric vehicles are so quiet that an acoustic notification generating device may be fitted to the quiet vehicle so that pedestrians may be properly warned of the approaching vehicle. JP2007-283809A discloses such a device.

An autonomous driving vehicle may be configured to execute a stop process in which the vehicle is autonomously driven to and brought to a stop at a selected stop area in an emergency situation such as when the driver has lost consciousness. See WO2019/106787A1, for example. The vehicle control system disclosed in this prior patent publication issues an acoustic notification to surrounding vehicles when the stop process is executed. The mode of acoustic notification is varied depending on the state of the vehicle and the surrounding environment of the vehicle.

A larger number of people can be warned with an increasing loudness of the acoustic notification. It is desirable to be able to notify a large number of people under ordinary circumstances, but an excessively loud acoustic notification may annoy or distract the surrounding people, in particular those who are approaching the vehicle to provide an aid.

SUMMARY OF THE INVENTION

In view of such a problem of the prior art, a primary object of the present invention is to provide a vehicle control system configured for autonomous driving that issues an acoustic notification when the vehicle has come to a stop or is coming to a stop in an emergency situation such that the annoyance to the surrounding people may be minimized.

To achieve such an object, the present invention provides a vehicle control system (1, 101, 201, 301, 401) configured for autonomous driving, comprising: a control unit (15) for steering, accelerating, and decelerating a vehicle; a surrounding condition acquiring unit (61) configured to acquire a surrounding condition of the vehicle; and an external notification device (14) configured to generate an acoustic notification at a first notification volume and the acoustic notification at a second notification volume higher than the first notification volume to a surrounding part of the vehicle; wherein the control unit is configured to execute a stop process by which the vehicle is parked in a prescribed stop area when it is detected that the control unit or the driver has become incapable of properly maintaining a traveling state of the vehicle, and wherein the control unit is configured to determine if a person is present within a predetermined range from the vehicle according to information obtained by the surrounding condition acquiring unit (ST12), the control unit causing the external notification device to generate the acoustic notification at the first notification volume when a person is present within the predetermined range (ST13), and at the second notification volume when a person is not present within the predetermined range (ST14).

Thereby, when a person is present near the vehicle, the notification volume of the acoustic notification is reduced so that the annoyance to the surrounding people can be minimized.

Preferably, the surrounding condition acquiring unit comprises an external camera configured to capture a view outside of the vehicle.

Thereby, the presence or absence of a person who is present close enough to provide a rescue can be determined with ease.

Preferably, the control unit is configured to determine a presence or an absence of an object that moves at a speed equal to or higher than a predetermined value within a predetermined range from the vehicle according to a surrounding condition acquired by the surrounding condition acquiring unit, the control unit determining a presence of a person when an object moving at a speed equal to or higher than the predetermined value within the predetermined range from the vehicle is detected, and an absence of a person when an object moving at a speed equal to or higher than the predetermined value within the predetermined range from the vehicle is not detected.

The presence of a person sufficiently near the vehicle to provide a rescue can be determined by acquiring an object that moves at a speed equal to or higher than the predetermined value.

Preferably, the surrounding condition acquiring unit further includes a navigation device (9) that retains map information, and is configured to identify a position of the vehicle, and the control unit is configured to acquire a presence or an absence of a building located within a predetermined range from the vehicle according to the position of the vehicle identified by the navigation device and the map information, the control unit determining the presence of a person when the presence of a building within the predetermined range is acquired, and the absence of a person when the absence of a building within the predetermined range is acquired.

The presence of a person within the predetermined range can be expected from the presence of a building within the predetermined range because the presence of a building is likely to indicate the presence of a person within the building.

Preferably, the vehicle control system further includes an occupant monitoring device (11) for monitoring an occupant of the vehicle, wherein the external notification device is configured to emit the acoustic notification at a third notification volume greater than the second notification volume and a fourth notification volume greater than the third notification volume, in addition to at the first notification volume and the second notification volume, and the control unit is configured to determine if a person is present within the predetermined range from the vehicle according to information acquired by the surrounding condition acquiring unit (ST12), to determine a number of fellow occupants (occupants other than the driver) in the vehicle according to information acquired by the occupant monitoring device (ST41, ST44), to cause the acoustic notification to be emitted at the first notification volume when a person is present within the predetermined range from the vehicle and at least one fellow occupant is on board the vehicle (ST42), to cause the acoustic notification to be emitted at the second notification volume when a person is present within the predetermined range from the vehicle and no fellow occupant is on board the vehicle (ST43), to cause the acoustic notification to be emitted at the third notification volume when no person is present within the predetermined range from the vehicle and at least one fellow occupant is on board the vehicle (ST45), and to cause the acoustic notification to be emitted at the fourth notification volume when no person is present within the predetermined range from the vehicle and no fellow occupant is on board the vehicle (ST46).

When no fellow occupant is on board the vehicle, there is a greater need for a rescue so that the notification volume is increased when no fellow occupant is on board the vehicle than when at least one fellow occupant is on board the vehicle.

Preferably, the vehicle further includes an occupant monitoring device (11) for monitoring an occupant of the vehicle, wherein the external notification device is configured to emit the acoustic notification at a third notification volume greater than the second notification volume and a fourth notification volume greater than the third notification volume, in addition to at the first notification volume and the second notification volume, and the control unit is configured to determine if a person is present within the predetermined range from the vehicle according to information acquired by the surrounding condition acquiring unit (ST12), to determine a number of children in the vehicle according to information acquired by the occupant monitoring device (ST51, ST52), to cause the acoustic notification to be emitted at the first notification volume when a person is present within the predetermined range from the vehicle and no child is on board the vehicle (ST42), to cause the acoustic notification to be emitted at the second notification volume when a person is present within the predetermined range from the vehicle and at least one child is on board the vehicle (ST43), to cause the acoustic notification to be emitted at the third notification volume when no person is present within the predetermined range from the vehicle and no child is on board the vehicle (ST45), and to cause the acoustic notification to be emitted at the fourth notification volume when no person is present within the predetermined range from the vehicle and at least one child is on board the vehicle (ST46).

Thus, the acoustic notification is made at a higher notification volume when at least one child is on board the vehicle than when no child is on board the vehicle so that the notification volume can be appropriately proportioned to the need for a rescue.

Preferably, the external notification device is configured to emit the acoustic notification rearward, leftward and/or rightward, in addition to emitting the acoustic notification forward.

Thereby, the acoustic notification can be effectively emitted to the surrounding.

The present invention thus provides a vehicle control system configured for autonomous driving that issues an acoustic notification when the vehicle has come to a stop or is coming to a stop in an emergency situation such that the annoyance to the surrounding people may be minimized.

BRIEF DESCRIPTION OF THE DRAWING(S)

DESCRIPTION OF THE PREFERRED EMBODIMENT(S)

First Embodiment

A vehicle control system according to a preferred embodiment of the present invention is described in the following with reference to the appended drawings. The following disclosure is according to left-hand traffic. In the case of right-hand traffic, the left and the right in the disclosure will be reversed.

Figure 1:
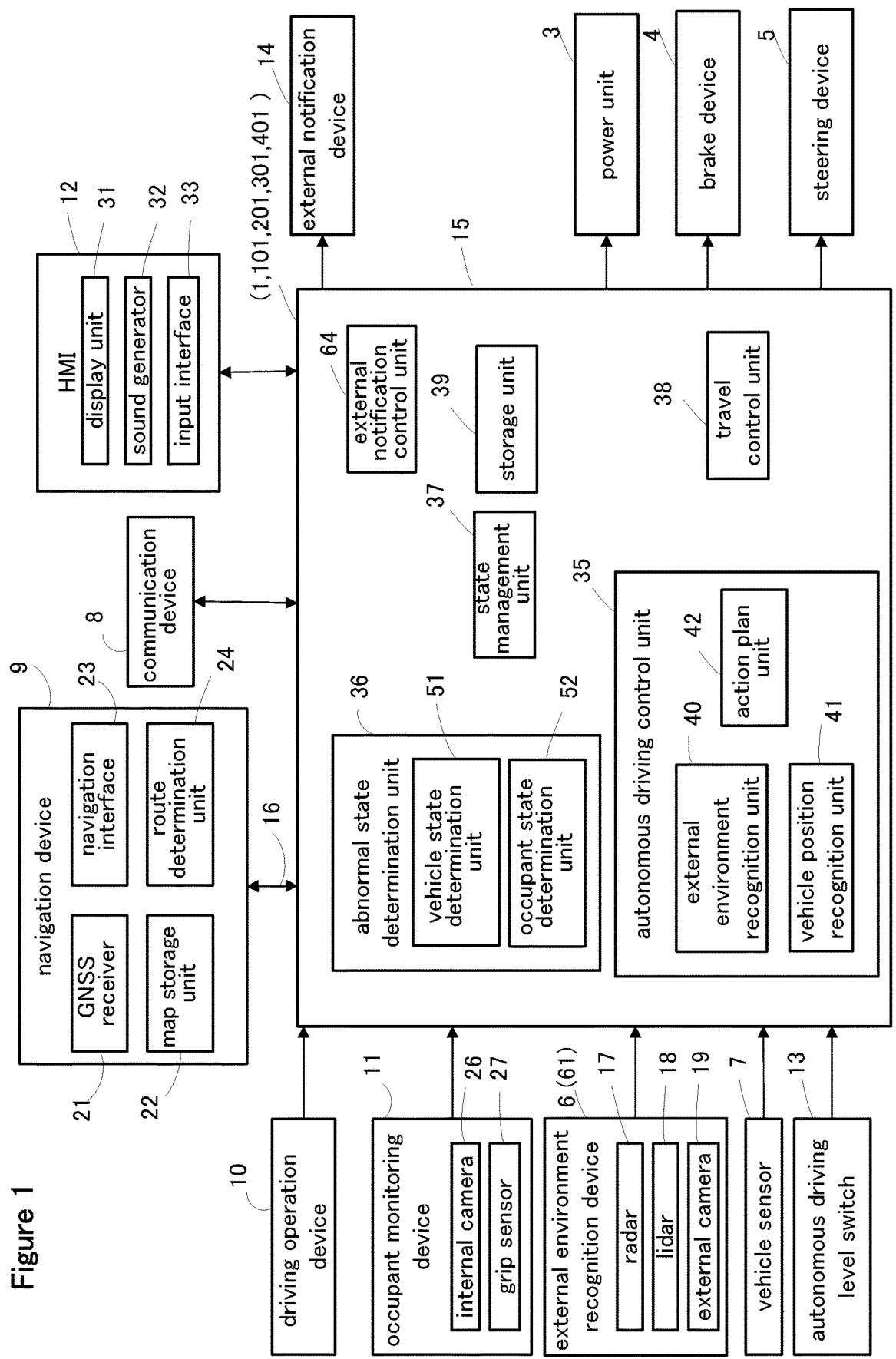
FIG. 1 is a functional block diagram of a vehicle on which a vehicle control system according to the present invention is mounted.

As shown in FIG. 1, the vehicle control system 1 according to the present invention is a part of a vehicle system 2 mounted on a vehicle. The vehicle system 2 includes a power unit 3, a brake device 4, a steering device 5, an external environment recognition device 6, a vehicle sensor 7, a communication device 8, a navigation device 9 (map device), a driving operation device 10, an occupant monitoring device 11, an HMI 12 (Human Machine Interface), an autonomous driving level switch 13, an external notification device 14, and a control unit 15. These components of the vehicle system 2 are connected to one another so that signals can be transmitted between them via a communication means such as CAN 16 (Controller Area Network).

The power unit 3 is a device for applying a driving force to the vehicle, and may include a power source and a transmission unit. The power source may consist of an internal combustion engine such as a gasoline engine and a diesel engine, an electric motor or a combination of these. The brake device 4 is a device that applies a braking force to the vehicle, and may include a brake caliper that presses a brake pad against a brake rotor, and an electrically actuated hydraulic cylinder that supplies hydraulic pressure to the brake caliper. The brake device 4 may also include a parking brake device. The steering device 5 is a device for changing a steering angle of the wheels, and may include a rack-and-pinion mechanism that steers the front wheels, and an electric motor that drives the rack-and-pinion mechanism. The power unit 3, the brake device 4, and the steering device 5 are controlled by the control unit 15.

The external environment recognition device 6 is a device that detects objects located outside of the vehicle. The external environment recognition device 6 may include a sensor that captures electromagnetic waves or light from around the vehicle to detect objects outside of the vehicle, and may consist of a radar 17, a lidar 18, an external camera 19, or a combination of these. The external environment recognition device 6 may also be configured to detect objects outside of the vehicle by receiving a signal from a source outside of the vehicle. The detection result of the external environment recognition device 6 is forwarded to the control unit 15.

The radar 17 emits radio waves such as millimeter waves to the surrounding area of the vehicle, and detects the position (distance and direction) of an object by capturing the reflected wave. Preferably, the radar 17 includes a front radar that radiates radio waves toward the front of the vehicle, a rear radar that radiates radio waves toward the rear of the vehicle, and a pair of side radars that radiates radio waves in the lateral directions.

The lidar 18 emits light such as an infrared ray to the surrounding part of the vehicle, and detects the position (distance and direction) of an object by capturing the reflected light. At least one lidar 18 is provided at a suitable position of the vehicle.

The external camera 19 can capture the image of the surrounding objects such as vehicles, pedestrians, guardrails, curbs, walls, median strips, road shapes, road signs, road markings painted on the road, and the like. The external camera 19 may consist of a digital camera using a solid-state imaging device such as a CCD and a CMOS. At least one external camera 19 is provided at a suitable position of the vehicle. The external camera 19 preferably includes a front camera that images the front of the vehicle, a rear camera that images the rear of the vehicle and a pair of side cameras that image the lateral views from the vehicle. The external camera 19 may consist of a stereo camera that can capture a three-dimensional image of the surrounding objects.

The vehicle sensor 7 may include a vehicle speed sensor that detects the traveling speed of the vehicle, an acceleration sensor that detects the acceleration of the vehicle, a yaw rate sensor that detects an angular velocity of the vehicle around a vertical axis, a direction sensor that detects the traveling direction of the vehicle, and the like. The yaw rate sensor may consist of a gyro sensor.

The communication device 8 allows communication between the control unit 15 which is connected to the navigation device 9 and other vehicles around the own vehicle as well as servers located outside the vehicle. The control unit 15 can perform wireless communication with the surrounding vehicles via the communication device 8. For instance, the control unit 15 can communicate with a server that provides traffic regulation information via the communication device 8, and with an emergency call center that accepts an emergency call from the vehicle also via the communication device 8. Further, the control unit 15 can communicate with a portable terminal carried by a person such as a pedestrian present outside the vehicle via the communication device 8.

The navigation device 9 is able to identify the current position of the vehicle, and performs route guidance to a destination and the like, and may include a GNSS receiver 21, a map storage unit 22, a navigation interface 23, and a route determination unit 24. The GNSS receiver 21 identifies the position (latitude and longitude) of the vehicle according to a signal received from artificial satellites (positioning satellites). The map storage unit 22 may consist of a per se known storage device such as a flash memory and a hard disk, and stores or retains map information. The navigation interface 23 receives an input of a destination or the like from the user, and provides various information to the user by visual display and/or speech. The navigation interface 23 may include a touch panel display, a speaker, and the like. In another embodiment, the GNSS receiver 21 is configured as a part of the communication device 8. The map storage unit 22 may be configured as a part of the control unit 15 or may be configured as a part of an external server that can communicate with the control unit 15 via the communication device 8.

The map information may include a wide range of road information which may include, not exclusively, road types such as expressways, toll roads, national roads, and prefectural roads, the number of lanes of the road, road markings such as the center position of each lane (three-dimensional coordinates including longitude, latitude, and height), road division lines and lane lines, the presence or absence of sidewalks, curbs, fences, etc., the locations of intersections, the locations of merging and branching points of lanes, the areas of emergency parking zones, the width of each lane, and traffic signs provided along the roads. The map information may also include traffic regulation information, address information (address/postal code), facility information, telephone number information, and the like.

The route determination unit 24 determines a route to the destination according to the position of the vehicle specified by the GNSS receiver 21, the destination input from the navigation interface 23, and the map information. When determining the route, in addition to the route, the route determination unit 24 determines the target lane which the vehicle will travel in by referring to the merging and branching points of the lanes in the map information.

The driving operation device 10 receives an input operation performed by the driver to control the vehicle. The driving operation device 10 may include a steering wheel, an accelerator pedal, and a brake pedal. Further, the driving operation device 10 may include a shift lever, a parking brake lever, and the like. Each element of the driving operation device 10 is provided with a sensor for detecting an operation amount of the corresponding operation. The driving operation device 10 outputs a signal indicating the operation amount to the control unit 15.

The occupant monitoring device 11 monitors the state of the occupant in the passenger compartment. The occupant monitoring device 11 includes, for example, an internal camera 26 that images an occupant sitting on a seat in the vehicle cabin, and a grip sensor 27 provided on the steering wheel. The internal camera 26 is a digital camera using a solid-state imaging device such as a CCD and a CMOS. The grip sensor 27 is a sensor that detects if the driver is gripping the steering wheel, and outputs the presence or absence of the grip as a detection signal. The grip sensor 27 may be formed of a capacitance sensor or a piezoelectric device provided on the steering wheel. The occupant monitoring device 11 may include a heart rate sensor provided on the steering wheel or the seat, or a seating sensor provided on the seat. In addition, the occupant monitoring device 11 may be a wearable device that is worn by the occupant, and can detect the vital information of the driver including at least one of the heart rate and the blood pressure of the driver. In this conjunction, the occupant monitoring device 11 may be configured to be able to communicate with the control unit 15 via a per se known wireless communication means. The occupant monitoring device 11 outputs the captured image and the detection signal to the control unit 15.

The external notification device 14 is a device for notifying to people outside of the vehicle by sound and/or light, and may include a warning light and a horn. A headlight (front light), a taillight, a brake lamp, a hazard lamp, and a vehicle interior light may function as a warning light.

The HMI 12 notifies the occupant of various kinds of information by visual display and speech, and receives an input operation by the occupant. The HMI 12 may include at least one of a display device 31 such as a touch panel and an indicator light including an LCD or an organic EL, a sound generator 32 such as a buzzer and a speaker, and an input interface 33 such as a GUI switch on the touch panel and a mechanical switch. The navigation interface 23 may be configured to function as the HMI 12.

The autonomous driving level switch 13 is a switch that activates autonomous driving as an instruction from the driver. The autonomous driving level switch 13 may be a mechanical switch or a GUI switch displayed on the touch panel, and is positioned in a suitable part of the cabin. The autonomous driving level switch 13 may be formed by the input interface 33 of the HMI 12 or may be formed by the navigation interface 23.

The control unit 15 may consist of an electronic control unit (ECU) including a CPU, a ROM, a RAM, and the like. The control unit 15 executes various types of vehicle control by executing arithmetic processes according to a computer program executed by the CPU. The control unit 15 may be configured as a single piece of hardware, or may be configured as a unit including a plurality of pieces of hardware. In addition, at least a part of each functional unit of the control unit 15 may be realized by hardware such as an LSI, an ASIC, and an FPGA, or may be realized by a combination of software and hardware.

The control unit 15 is configured to execute autonomous driving control of at least level 0 to level 3 by combining various types of vehicle control. The level is according to the definition of SAE J3016, and is determined in relation to the degree of machine intervention in the driving operation of the driver and in the monitoring of the surrounding environment of the vehicle.

In autonomous driving of level 0, the control unit 15 does not control the vehicle, and the driver performs all of the driving operations. Thus, autonomous driving of level 0 means a manual driving.

In autonomous driving of level 1, the control unit 15 executes a certain part of the driving operation, and the driver performs the remaining part of the driving operation. For example, autonomous driving level 1 includes constant speed traveling, inter-vehicle distance control (ACC; Adaptive Cruise Control) and lane keeping assist control (LKAS; Lane Keeping Assistance System). The level 1 autonomous driving is executed when various devices (for example, the external environment recognition device 6 and the vehicle sensor 7) required for executing the level 1 autonomous driving are all properly functioning.

In autonomous driving of level 2, the control unit 15 performs the entire driving operation. The level 2 autonomous driving is performed only when the driver monitors the surrounding environment of the vehicle, the vehicle is within a designated area, and the various devices required for performing the level 2 autonomous driving are all functioning properly.

In level 3 autonomous driving, the control unit 15 performs the entire driving operation. The level 3 autonomous driving requires the driver to monitor or be aware of the surrounding environment when required, and is executed only when the vehicle is within a designated area, and the various devices required for performing the level 3 autonomous driving are all functioning properly. The conditions under which the level 3 autonomous driving is executed may include that the vehicle is traveling on a congested road. Whether the vehicle is traveling on a congested road or not may be determined according to traffic regulation information provided from a server outside of the vehicle, or, alternatively, that the vehicle speed detected by the vehicle speed sensor is determined to be lower than a predetermined slowdown determination value (for example, 30 km/h) over a predetermined time period.

Thus, in the autonomous driving of levels 1 to 3, the control unit 15 executes at least one of the steering, the acceleration, the deceleration, and the monitoring of the surrounding environment. When in the autonomous driving mode, the control unit 15 executes the autonomous driving of level 1 to level 3. Hereinafter, the steering, acceleration, and deceleration operations are collectively referred to as driving operation, and the driving and the monitoring of the surrounding environment may be collectively referred to as driving.

In the present embodiment, when the control unit 15 has received an instruction to execute autonomous driving via the autonomous driving level switch 13, the control unit 15 selects the autonomous driving level that is suitable for the environment of the vehicle according to the detection result of the external environment recognition device 6 and the position of the vehicle acquired by the navigation device 9, and changes the autonomous driving level as required. However, the control unit 15 may also change the autonomous driving level according the input to the autonomous driving level switch 13.

As shown in FIG. 1, the control unit 15 includes an autonomous driving control unit 35, an abnormal state determination unit 36, a state management unit 37, a travel control unit 38, and a storage unit 39.

The autonomous driving control unit 35 includes an external environment recognition unit 40, a vehicle position recognition unit 41, and an action plan unit 42. The external environment recognition unit 40 recognizes an obstacle located around the vehicle, the shape of the road, the presence or absence of a sidewalk, and road signs according to the detection result of the external environment recognition device 6. The obstacles include, not exclusively, guardrails, telephone poles, surrounding vehicles, and pedestrians. The external environment recognition unit 40 can acquire the state of the surrounding vehicles, such as the position, speed, and acceleration of each surrounding vehicle from the detection result of the external environment recognition device 6. The position of each surrounding vehicle may be recognized as a representative point such as a center of gravity position or a corner positions of the surrounding vehicle, or an area represented by the contour of the surrounding vehicle.

The vehicle position recognition unit 41 recognizes a traveling lane, which is a lane in which the vehicle is traveling, and a relative position and an angle of the vehicle with respect to the traveling lane. The vehicle position recognition unit 41 may recognize the traveling lane according to the map information stored in the map storage unit 22 and the position of the vehicle acquired by the GNSS receiver 21. In addition, the lane markings drawn on the road surface around the vehicle may be extracted from the map information, and the relative position and angle of the vehicle with respect to the traveling lane may be recognized by comparing the extracted lane markings with the lane markings captured by the external camera 19.

The action plan unit 42 sequentially creates an action plan for driving the vehicle along the route. More specifically, the action plan unit 42 first determines a set of events for traveling on the target lane determined by the route determination unit 24 without the vehicle coming into contact with an obstacle. The events may include a constant speed traveling event in which the vehicle travels in the same lane at a constant speed, a preceding vehicle following event in which the vehicle follows a preceding vehicle at a certain speed which is equal to or lower than a speed selected by the driver or a speed which is determined by the prevailing environment, a lane changing event in which the vehicle change lanes, a passing event in which the vehicle passes a preceding vehicle, a merging event in which the vehicle merge into the traffic from another road at a junction of the road, a diverging event in which the vehicle travels into a selected road at a junction of the road, an autonomous driving end event in which autonomous driving is ended, and the driver takes over the driving operation, and a stop event in which the vehicle is brought to a stop when a certain condition is met, the condition including a case where the control unit 15 or the driver has become incapable of continuing the driving operation.

The conditions under which the action plan unit 42 invokes the stop event include the case where an input to the internal camera 26, the grip sensor 27, or the autonomous driving level switch 13 in response to an intervention request (a hand-over request) to the driver is not detected during autonomous driving. The intervention request is a warning to the driver to take over a part of the driving, and to perform at least one of the driving operation and the monitoring of the environment corresponding to the part of the driving that is to be handed over. The condition under which the action plan unit 42 invokes the stop even include the case where the action plan unit 42 has detected that the driver has become incapable of performing the driving while the vehicle is traveling due to a physiological ailment according to the signal from a pulse sensor, the internal camera or the like.

During the execution of these events, the action plan unit 42 may invoke an avoidance event for avoiding an obstacle or the like according to the surrounding conditions of the vehicle (existence of nearby vehicles and pedestrians, lane narrowing due to road construction, etc.).

The action plan unit 42 generates a target trajectory for the vehicle to travel in the future corresponding to the selected event. The target trajectory is obtained by sequentially arranging trajectory points that the vehicle should trace at each time point. The action plan unit 42 may generate the target trajectory according to the target speed and the target acceleration set for each event. At this time, the information on the target speed and the target acceleration is determined for each interval between the trajectory points.

The travel control unit 38 controls the power unit 3, the brake device 4, and the steering device 5 so that the vehicle traces the target trajectory generated by the action plan unit 42 according to the schedule also generated by the action plan unit 42.

The storage unit 39 is formed by a ROM, a RAM, or the like, and stores information required for the processing by the autonomous driving control unit 35, the abnormal state determination unit 36, the state management unit 37, and the travel control unit 38.

The abnormal state determination unit 36 includes a vehicle state determination unit 51 and an occupant state determination unit 52. The vehicle state determination unit 51 analyzes signals from various devices (for example, the external environment recognition device 6 and the vehicle sensor 7) that affect the level of the autonomous driving that is being executed, and detects the occurrence of an abnormality in any of the devices and units that may prevent a proper execution of the autonomous driving of the level that is being executed.

The occupant state determination unit 52 determines if the driver is in an abnormal state or not according to a signal from the occupant monitoring device 11. The abnormal state includes the case where the driver is unable to properly steer the vehicle in autonomous driving of level 1 or lower that requires the driver to steer the vehicle. That the driver is unable to steer the vehicle in autonomous driving of level 1 or lower could mean that the driver is not holding the steering wheel, the driver is asleep, the driver is incapacitated or unconscious due to illness or injury, or the driver is under a cardiac arrest. The occupant state determination unit 52 determines that the driver is in an abnormal state when there is no input to the grip sensor 27 from the driver while in autonomous driving of level 1 or lower that requires the driver to steer the vehicle. Further, the occupant state determination unit 52 may determine the open/closed state of the driver's eyelids from the face image of the driver that is extracted from the output of the internal camera 26. The occupant state determination unit 52 may determine that the driver is asleep, under a strong drowsiness, unconscious or under a cardiac arrest so that the drive is unable to properly drive the vehicle, and the driver is in an abnormal condition when the driver's eyelids are closed for more than a predetermined time period, or when the number of times the eyelids are closed per unit time interval is equal to or greater than a predetermined threshold value. The occupant state determination unit 52 may further acquire the driver's posture from the captured image to determine that the driver's posture is not suitable for the driving operation or that the posture of the driver does not change for a predetermined time period. It may well mean that the driver is incapacitated due to illness or injury, and in an abnormal condition.

In the case of autonomous driving of level 2 or lower, the abnormal condition includes a situation where the driver is neglecting the duty to monitor the environment surrounding the vehicle. This situation may include either the case where the driver is not holding or gripping the steering wheel or the case where the driver's line of sight is not directed in the forward direction. The occupant state determination unit 52 may detect the abnormal condition where the driver is neglecting to monitor the environment surrounding the vehicle when the output signal of the grip sensor 27 indicates that the driver is not holding the steering wheel. The occupant state determination unit 52 may detect the abnormal condition according to the image captured by the internal camera 26. The occupant state determination unit 52 may use a per se known image analysis technique to extract the face region of the driver from the captured image, and then extracts the iris parts (hereinafter, iris) including the inner and outer corners of the eyes and pupils from the extracted face area. The occupant state determination unit 52 may detect the driver's line of sight according to the positions of the inner and outer corners of the eyes, the iris, the outline of the iris, and the like. It is determined that the driver is neglecting the duty to monitor the environment surrounding the vehicle when the driver's line of sight is not directed in the forward direction.

In addition, in the autonomous driving at a level where the drive is not required to monitor the surrounding environment or in the autonomous driving of level 3, an abnormal condition refers to a state in which the driver cannot promptly take over the driving when a driving takeover request is issued to the driver. The state where the driver cannot take over the driving includes the state where the system cannot be monitored, or, in other words, where the driver cannot monitor a screen display that may be showing an alarm display such as when the driver is asleep, and when the driver is not looking ahead. In the present embodiment, in the level 3 autonomous driving, the abnormal condition includes a case where the driver cannot perform the duty of monitoring the surrounding environment of the vehicle even though the driver is notified to monitor the surrounding environment of the vehicle. In the present embodiment, the occupant state determination unit 52 displays a predetermined screen on the display device 31 of the HMI 12, and instructs the driver to look at the display device 31. Thereafter, the occupant state determination unit 52 detects the driver's line of sight with the internal camera 26, and determines that the driver is unable to fulfill the duty of monitoring the surrounding environment of the vehicle if driver's line of sight is not facing the display device 31 of the HMI 12.

The occupant state determination unit 52 may detect if the driver is gripping the steering wheel according to the signal from the grip sensor 27, and if the driver is not gripping the steering wheel, it can be determined that the vehicle is in an abnormal state in which the duty of monitoring the surrounding environment the vehicle is being neglected. Further, the occupant state determination unit 52 determines if the driver is in an abnormal state according to the image captured by the internal camera 26. For example, the occupant state determination unit 52 extracts a driver's face region from the captured image by using a per se known image analysis means. The occupant state determination unit 52 may further extract iris parts (hereinafter, iris) of the driver including the inner and outer corners of the eyes and pupils from the extracted face area. The occupant state determination unit 52 obtains the driver's line of sight according to the extracted positions of the inner and outer corners of the eyes, the iris, the outline of the iris, and the like. It is determined that the driver is neglecting the duty to monitor the environment surrounding the vehicle when the driver's line of sight is not directed in the forward direction.

The state management unit 37 selects the level of the autonomous driving according to at least one of the own vehicle position, the operation of the autonomous driving level switch 13, and the determination result of the abnormal state determination unit 36. Further, the state management unit 37 controls the action plan unit 42 according to the selected autonomous driving level, thereby performing the autonomous driving according to the selected autonomous driving level. For example, when the state management unit 37 has selected the level 1 autonomous driving, and a constant speed traveling control is being executed, the event to be determined by the action plan unit 42 is limited only to the constant speed traveling event.

The state management unit 37 raises and lowers the autonomous driving level as required in addition to executing the autonomous driving according to the selected level.

More specifically, the state management unit 37 raises the level when the condition for executing the autonomous driving at the selected level is met, and an instruction to raise the level of the autonomous driving is input to the autonomous driving level switch 13.

When the condition for executing the autonomous driving of the current level ceases to be satisfied, or when an instruction to lower the level of the autonomous driving is input to the autonomous driving level switch 13, the state management unit 37 executes an intervention request process. In the intervention request process, the state management unit 37 first notifies the driver of a handover request. The notification to the driver may be made by displaying a message or image on the display device 31 or generating a speech or an acoustic notification from the sound generator 32. The notification to the driver may continue for a predetermined period of time after the intervention request process is started or may be continued until an input is detected by the occupant monitoring device 11.

The condition for executing the autonomous driving of the current level ceases to be satisfied when the vehicle has moved to an area where only the autonomous driving of a level lower than the current level is permitted, or when the abnormal state determination unit 36 has determined that an abnormal condition that prevents the continuation of the autonomous driving of the current level has occurred to the driver or the vehicle.

Following the notification to the driver, the state management unit 37 detects if the internal camera 26 or the grip sensor 27 has received an input from the driver indicating a takeover of the driving. The detection of the presence or absence of an input to take over the driving is determined in a way that depends on the level that is to be selected. When moving to level 2, the state management unit 37 extracts the driver's line of sight from the image acquired by the internal camera 26, and when the driver's line of sight is facing the front of the vehicle, it is determined that an input indicating the takeover of the driving by the driver is received. When moving to level 1 or level 0, the state management unit 37 determines that there is an input indicating an intent to take over the driving when the grip sensor 27 has detected the gripping of the steering wheel by the driver. Thus, the internal camera 26 and the grip sensor 27 function as an intervention detection device that detects an intervention of the driver to the driving. Further, the state management unit 37 may detect if there is an input indicating an intervention of the driver to the driving according to the input to the autonomous driving level switch 13.

The state management unit 37 lowers the autonomous driving level when an input indicating an intervention to the driving is detected within a predetermined period of time from the start of the intervention request process. At this time, the level of the autonomous driving after the lowering of the level may be level 0, or may be the highest level that can be executed.

The state management unit 37 causes the action plan unit 42 to generate a stop event when an input corresponding to the driver's intervention to the driving is not detected within a predetermined period of time after the execution of the intervention request process. The stop event is an event in which the vehicle is brought to a stop at a safe position (for example, an emergency parking zone, a roadside zone, a roadside shoulder, a parking area, etc.) while the vehicle control is degenerated. Here, a series of procedures executed in the stop event may be referred to as MRM (Minimum Risk Maneuver).

Figure 2:
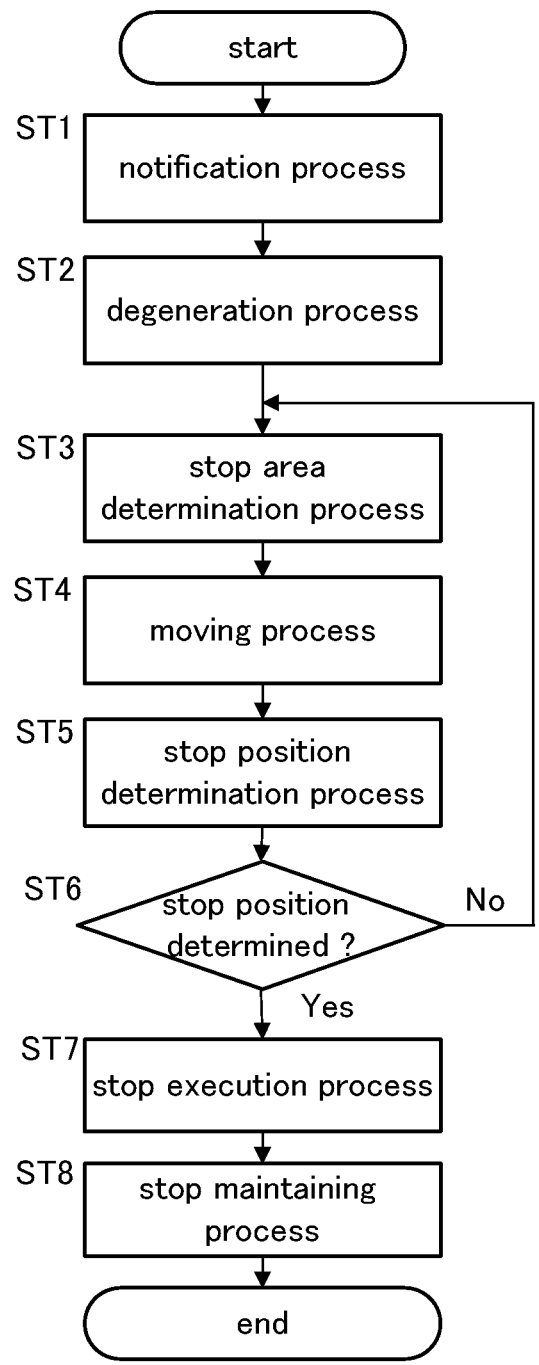
FIG. 2 is a flowchart of a stop process.

When the stop event is invoked, the control unit 15 shifts from the autonomous driving mode to the autonomous stopping mode, and the action plan unit 42 executes the stop process. Hereinafter, an outline of the stop process is described with reference to the flowchart of FIG. 2.

In the stop process, a notification process is first executed (step ST1). In the notification process, the action plan unit 42 operates the external notification device 14 to notify the people outside of the vehicle. For example, the action plan unit 42 activates a horn included in the external notification device 14 to periodically generate an acoustic notification. The notification process continues until the stop process ends. After the notification process has ended, the action plan unit 42 may continue to activate the horn to generate an acoustic notification depending on the situation.

Then, a degeneration process is executed (step ST2). The degeneration process is a process of restricting events that can be invoked by the action plan unit 42. The degeneration process may prohibit a lane change event to a passing lane, a passing event, a merging event, and the like. Further, in the degeneration process, the speed upper limit and the acceleration upper limit of the vehicle may be more limited in the respective events as compared with the case where the stop process is not performed.

Next, a stop area determination process is executed (step ST3). The stop area determination process refers to the map information according to the current position of the own vehicle, and extracts a plurality of available stop areas (candidates for the stop area or potential stop areas) suitable for stopping, such as road shoulders and evacuation spaces in the traveling direction of the own vehicle. Then, one of the available stop areas is selected as the stop area by taking into account the size of the stop area, the distance to the stop area, and the like.

Next, a moving process is executed (step ST4). In the moving process, a route for reaching the stop area is determined, various events along the route leading to the stop area are generated, and a target trajectory is determined. The travel control unit 38 controls the power unit 3, the brake device 4, and the steering device 5 according to the target trajectory determined by the action plan unit 42. The vehicle then travels along the route and reaches the stop area.

Next, a stop position determination process is executed (step ST5). In the stop position determination process, the stop position is determined according to obstacles, road markings, and other objects located around the vehicle recognized by the external environment recognition unit 40. In the stop position determination process, it is possible that the stop position cannot be determined in the stop area due to the presence of surrounding vehicles and obstacles. When the stop position cannot be determined in the stop position determination process (No in step ST6), the stop area determination process (step ST3), the movement process (step ST4), and the stop position determination process (step ST5) are sequentially repeated.

If the stop position can be determined in the stop position determination process (Yes in step ST6), a stop execution process is executed (step ST7). In the stop execution process, the action plan unit 42 generates a target trajectory according to the current position of the vehicle and the targeted stop position. The travel control unit 38 controls the power unit 3, the brake device 4, and the steering device 5 according to the target trajectory determined by the action plan unit 42. The vehicle then moves toward the stop position and stops at the stop position.

After the stop execution process is executed, a stop maintaining process is executed (step ST8). In the stop maintaining process, the travel control unit 38 drives the parking brake device according to a command from the action plan unit 42 to maintain the vehicle at the stop position. Thereafter, the action plan unit 42 may transmit an emergency call to the emergency call center by the communication device 8. When the stop maintaining process is completed, the stop process ends.

Figure 3:
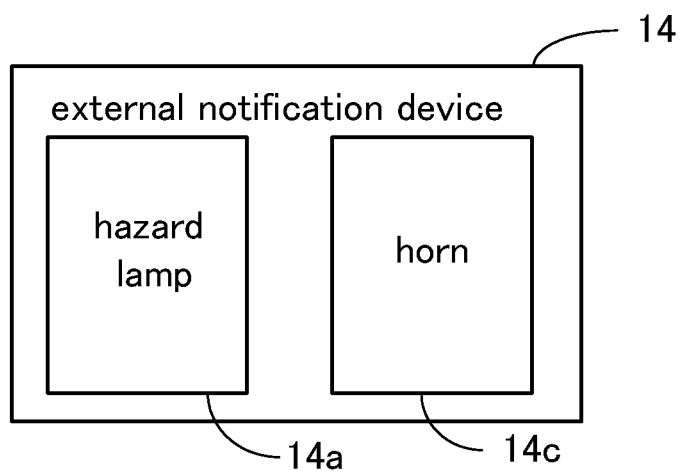
FIG. 3 is a functional block diagram of an external notification device.

In the present embodiment, the vehicle control system 1 includes the control unit 15, the input interface 33, the occupant monitoring device 11, the external environment recognition device 6, and the external notification device 14 as mentioned earlier, and the external environment recognition device 6 additionally serves as a surrounding condition acquiring unit 61. As shown in FIG. 3, the external notification device 14 includes a hazard lamp 14a configured to blink when activated, and a horn 14c serving as an acoustic notification unit. Depending on if a person is present within a predetermined range of the vehicle, the notification volume of the horn 14c is changed to minimize the annoyance and distraction to the surrounding people. The control unit 15 includes an external notification control unit 64 that controls the hazard lamp 14a and the horn 14c.

The hazard lamp 14a includes a pair of light sources provided on either side of the front end of the vehicle, and a pair of light sources provided on either side of the rear end of the vehicle.

The external notification control unit 64 controls the voltage applied to each light source according to the signal from the action plan unit 42, and can control the turning on and off of each light source provided on the front and back ends of the vehicle.

The horn 14c emits an acoustic notification in a forward direction of the vehicle when a voltage is applied thereto. The acoustic notification may be set at such a notification volume that a person located within about 100 m in front of the vehicle can recognize the acoustic notification so that the person may know of a risk of an accident. In the present embodiment, the horn 14c emits the acoustic notification toward the front of the vehicle. However, the horn 14c may be configured to emit an acoustic notification toward any one of the rear, left side, and right side of the vehicle, in addition to the front of the vehicle.

The external notification control unit 64 can apply a voltage to the horn 14c according to a signal from the action plan unit 42 to generate an acoustic notification from the horn 14c. In the vehicle control system 1 according to the present invention, the external notification control unit 64 can set the notification volume of the acoustic notification generated from the horn 14c to at least a first notification volume and a second notification volume which is higher than the first notification volume.

The notification volume may be changed by varying the voltage applied to the horn 14c by the external notification control unit 64, or by changing the duty ratio of the voltage applied to the horn 13c as well known in the art. The larger the duty ratio is, the higher the notification volume of the horn 14c becomes. For instance, the first notification volume may be achieved by setting the duty ratio to 0.25, and the second notification volume may be achieved by setting the duty ratio to 0.5.

The external notification control unit 64 may generate the acoustic notification in a prescribed pattern. For instance, the acoustic notification may consist of repeating a period of acoustic emission of a certain time duration (such as 5 seconds) and a period of silence of a certain time duration (such as 5 seconds) on after the other. The time duration of silence may be different from the time duration of acoustic emission.

Figure 4:
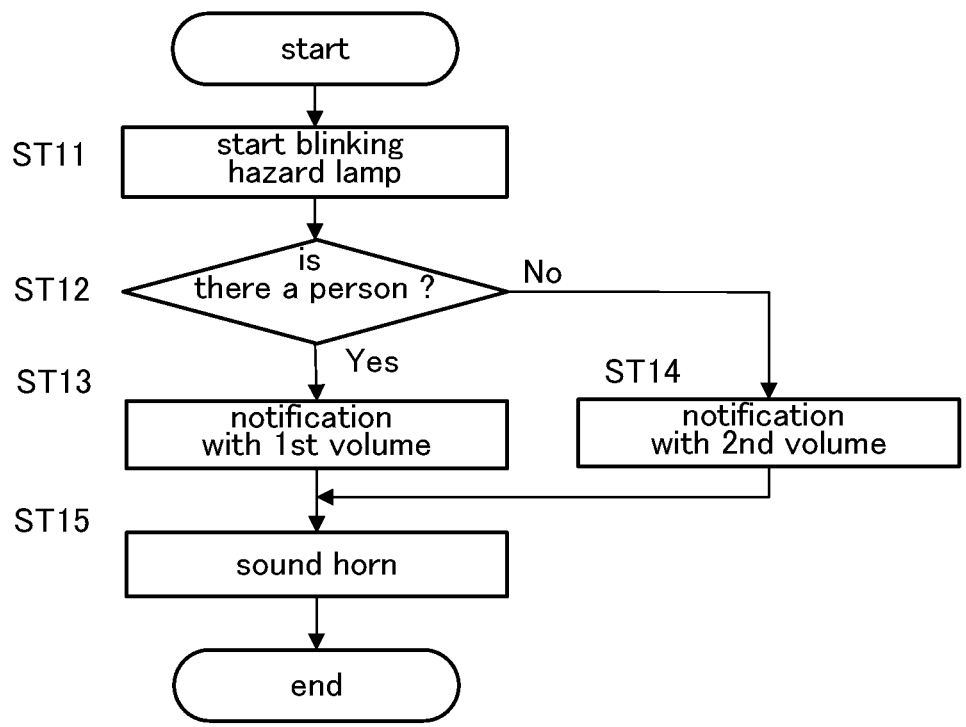
FIG. 4 is a flowchart of a notification process according to a first embodiment of the present invention.
Figure 5:
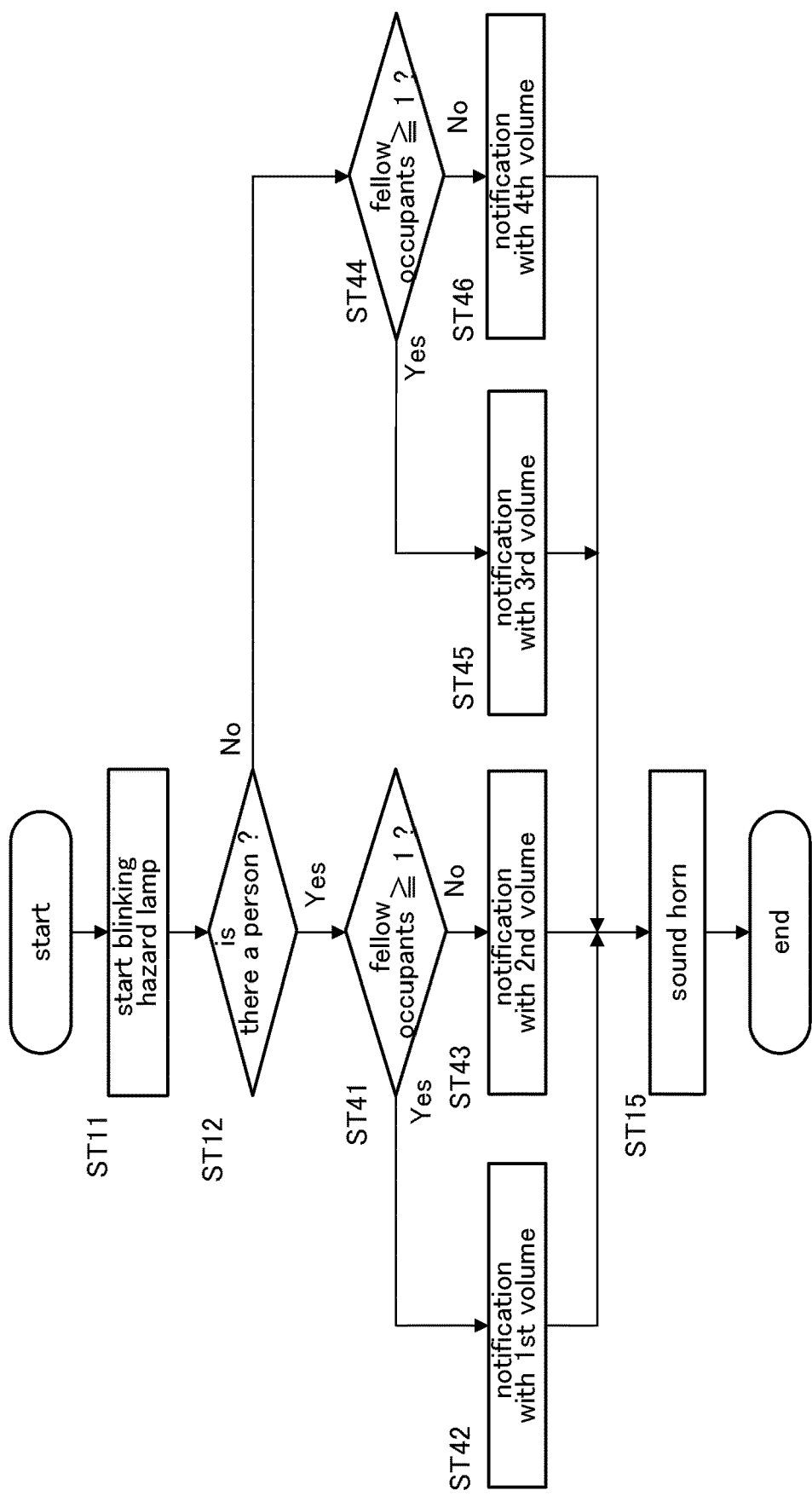
FIG. 5 is a flowchart of a notification process according to a fourth embodiment of the present invention.
Figure 6:
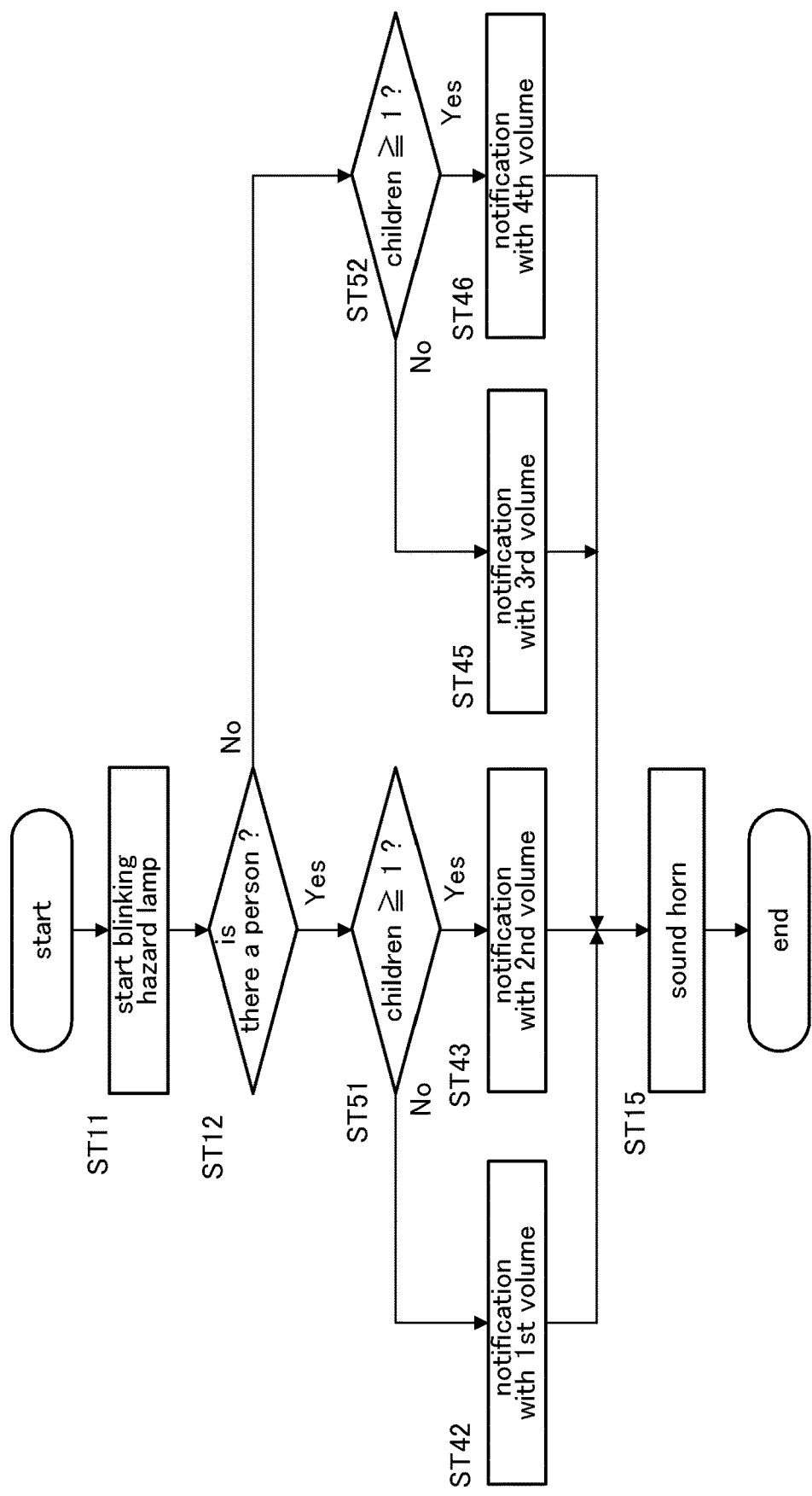
FIG. 6 is a flowchart of a notification process according to a fifth embodiment of the present invention.

Details of the notification process in the vehicle control system 1 according to the present invention are described in the following with reference to FIG. 4.

In the first step ST11 of the notification process, the action plan unit 42 transmits a command signal to the external notification control unit 64 to start blinking the hazard lamp 14a and to continue the blinking until receiving a command signal to stop the blinking. Upon completion of the transmission of the signal, the action plan unit 42 executes step ST12.

In step ST12, the action plan unit 42 acquires information on the surrounding environment including the presence or absence of an object within the predetermined range from the vehicle by using the external environment recognition device 6, and analyzes the obtained information on the surrounding environment to determine the presence of a person within the predetermined range. More specifically, first, the action plan unit 42 performs a process (fusion process) of fusing the images captured by the external camera 19, the radar 17 and the lidar 18 to create a fusion image. The action plan unit 42 then executes a per se known image analysis (for example, by performing grayscale conversion to extract features such as luminance variance) on the fusion image to extract an object from the fusion image. Further, the action plan unit 42 detects an object representing a person from the extracted objects by executing a per se known image processing such as template matching process or edge detection process. Thereafter, the action plan unit 42 acquires the distance of each of the objects representing persons from the vehicle according to the information acquired by the radar 17 and/or the lidar 18. Thereafter, the action plan unit 42 determines if each of the objects indicating a person is located within the predetermined range, and when the object indicating at least one person is found within the predetermined range, it is finally determined that a person is present within the predetermined range. The action plan unit 42 executes step ST13 when a person is detected within the predetermined range, and executes step ST14 when no person is detected within the predetermined range. The predetermined range may be 100 m, for instance.

In step ST13, the action plan unit 42 instructs the external notification control unit 64 to set the notification volume of the horn 14*c* to the first notification volume. Once the instruction is completed, the action plan unit 42 executes step ST15.

In step ST14, the action plan unit 42 instructs the external notification control unit 64 to set the notification volume of the horn 14*c* to the second notification volume. Once the instruction is completed, the action plan unit 42 executes step ST15.

In step ST15, the action plan unit 42 instructs the external notification control unit 64 to start emitting an acoustic notification from the horn 14*c* and to continue the emission until receiving a signal instructing to terminate the emission. Once the instruction is completed, the action plan unit 42 ends the notification process.

Upon completion of the notification process, the action plan unit 42 determines the stop area and causes the vehicle to travel toward the stop area. During this time, the external notification control unit 64 continuously emits an acoustic notification from the horn 14*c* at the selected notification volume. Even after the vehicle has come to a stop at the stop position, the external notification control unit 64 continues to emit the acoustic notification of the selected notification volume from the horn 14*c*. The action plan unit 42 ends the stop process when, for example, an input operation is applied to the driving operation device 10 by a fellow passenger by an operation amount equal to or greater than a predetermined threshold. At the same time, the emission of the acoustic notification is ended. Alternatively, upon elapsing of a predetermined time period after the vehicle has come to a stop, the action plan unit 42 may instruct the external notification control unit 64 to end the emission of the acoustic notification.

The mode of operation of the vehicle control system 1 described above is discussed in the following. According to the present embodiment, upon starting the notification process, the vehicle control system 1 determines if a person is present within the predetermined range from the vehicle according to the detection result of the external environment recognition device 6 (ST12). When a person is detected, the action plan unit 42 sets the notification volume of the horn 14*c* to the first notification volume (ST13). When no person is detected, the action plan unit 42 sets the notification volume to the second notification volume that is higher than the first notification volume (ST14).

The advantages of the vehicle control system 1 described above are discussed in the following. In the vehicle control system 1, when the driver is in an abnormal condition, and is unable to take over the driving, the stop process is initiated, and a state of emergency is notified to the outside by sound. At this time, when a person is present within the predetermined range from the vehicle, the notification volume is set to be lower than when the person is not present. Thereby, the annoyance to the persons present in the vicinity can be minimized within the predetermined range from the vehicle.

Second Embodiment

The vehicle control system 101 according to a second embodiment of the present invention is different from the vehicle control system 1 of the first embodiment in that the presence of a person within the predetermined range from the vehicle is determined by detecting an object moving at a speed equal to or higher than a prescribed value in step ST12 of the notification process. Otherwise, the second embodiment is not different from the first embodiment. Step ST12 of the second embodiment is described in the following, but the other part of the vehicle control system 1 is omitted from the following description.

In step ST12, the action plan unit 42 obtains information on the surrounding environment by using the external environment recognition device 6, and analyzes the obtained information on the surrounding environment to determine the presence or absence of an object within the predetermined range from the vehicle. In particular, the action plan unit 42 acquires the presence or absence of an object moving at a speed equal to or higher than a predetermined value from among the objects detected within the predetermined range. When an object moving at a speed equal to or higher than the predetermined value is recognized within the predetermined range, the action plan unit 42 determines that a person is present within the predetermined range. When an object moving at a speed equal to or higher than the predetermined value is not recognized within the predetermined range, it is determined that no person is present within the predetermined range. The action plan unit 42 executes step ST13 when it is determined that a person is present within the predetermined range from the vehicle, and executes step ST14 when it is determined that no person is present within the predetermined range from the vehicle. The reference distance for determination may be set to 100 m, for instance.

More specifically, first of all, the action plan unit 42 executes a process of fusing the images captured by the external camera 19, the radar 17, and the lidar 18 in the same manner as in the first embodiment, and extracts the object from the fusion image. The action plan unit 42 obtains a plurality of time-series fusion images and objects extracted from the time-series fusion images by repeatedly executing the process of creating a fusion image and the process of extracting an object at predetermined time intervals. The action plan unit 42 then compares the time-series fusion images to find out, from among the extracted objects, an object moving relative to the surrounding environment at a speed equal to or higher than the predetermined value. Based on the information obtained by the radar 17 or the lidar 18, the action plan unit 42 determines the distance from the vehicle to the object moving at the speed equal to or higher than the predetermined value with respect to the surrounding environment. Thereafter, the action plan unit 42 determines if the object moving at the speed equal to or higher than the predetermined value is located within the predetermined range. There may be a plurality of such objects at the same time, and in such a case, the vehicle control system accounts for all of such objects. When at least one object moving at a speed equal to or higher than the predetermined value is located within the predetermined range, the action plan unit 42 determines that a person is present within the predetermined range. When an object moving at a speed equal to or higher than the predetermined value is not located within the predetermined range, or when an object moving at a speed equal to or higher than the predetermined value is not detected, it is determined that no person is present within the predetermined range.

When an object moving at a speed equal to or higher than a predetermined value is recognized within the predetermined range from the vehicle, it can be estimated that a person is present. Therefore, when an object moving at a speed equal to or higher than the predetermined value is detected within the predetermined range from the vehicle, as it can be judged that a person is present within the predetermined range from the vehicle, the vehicle control system 1 according to the present embodiment sets the notification volume of the horn 14c to the first notification volume (ST13). When an object moving at a speed equal to or higher than a predetermined value is not recognized within the predetermined range from the vehicle, as it can be judged that a person is not present within the predetermined range from the vehicle, the notification volume of the horn 14c is set to the second notification volume (ST14).

The mode of operation of the thus configured vehicle control system 101 is discussed in the following. Upon starting the notification process, the vehicle control system 101 according to the present embodiment determines if an object moving at a speed equal to or higher than the predetermined value is recognized within the predetermined range from the vehicle according to the detection result of the external environment recognition device 6. When an object moving at a speed equal to or higher than the predetermined value is recognized within predetermined range, it is determined that a person is present within the predetermined range, and the notification volume is set to the first notification volume (ST13). When an object moving at a speed equal to or higher than the predetermined value is not recognized within the predetermined range, it is determined that no person is present within the predetermined range, and the notification volume is set to the second notification volume (ST14).

The advantages of the vehicle control system 101 configured as described above are discussed in the following. When an object moving at a speed equal to or higher than the predetermined value is recognized within the predetermined range from the vehicle, it is estimated that a person is present. According to the vehicle control system 101 of the present embodiment, presence of a person within the predetermined range is determined by detecting the presence of an object traveling at a speed equal to or higher than the predetermined value in the predetermined range from the current position of the vehicle. Therefore, the action plan unit 42 is not required to perform an image processing that is required to extract objects representing persons such as a template matching or an edge detection process on the objects extracted from the fusion image obtained by combining the images acquired by the external camera 19, the radar 17 and the lidar 18, for example. Thus, the determination of the presence of a person around the vehicle can be simplified.

Third Embodiment

The vehicle control system 201 according to a third embodiment of the present invention is different from the vehicle control system 1 of the first embodiment in that the surrounding condition acquiring unit 61 is provided with a navigation device 9 instead of the external environment recognition device 6, and in that the presence of a person within the predetermined range is determined according to the presence of a building within the predetermined distance from the current position in step ST12 of the notification process. Otherwise, the third embodiment is not different from the first embodiment. Details of step ST12 are discussed in the following, and the remaining part is omitted from the description.

In step ST12, the action plan unit 42 acquires the position information of the own vehicle received by the GNSS receiving unit 21, and detects a building located closest to the vehicle by comparing the acquired position information with the position information in the map storage unit 22. Thereafter, the action plan unit 42 computes the distance between the detected building and the vehicle. When the computed distance is equal to or less than the predetermined distance, the action plan unit 42 determines that a person is likely to be present within the predetermined range from the vehicle. If the computed distance is greater than the predetermined distance, it is determined that no person is likely to be present within the predetermined range from the vehicle. The action plan unit 42 executes step ST13 when it is determined that a person is likely to be present within the predetermined range from the vehicle, and executes step ST14 when it is determined that no person is likely to be present within the predetermined range from the vehicle. The predetermined distance for this determination process may be set to 100 m.

The mode of operation of the thus configured vehicle control system 201 of the third embodiment is discussed in the following. Upon starting the notification process, the vehicle control system 201 determines if a building is located within the predetermined range from the vehicle according to the map information retained by the navigation device 9. When a building is found to be located within the predetermined range, it can be presumed that a person is likely to be present within the predetermined range, and the notification volume is set to the first notification volume (ST13). When no building is found to be located within the predetermined range, it can be presumed that no person is likely to be present within the predetermined range, and the notification volume is set to the second notification volume (ST14).

The advantages of the vehicle control system 201 configured as described above are discussed in the following. When a building is found to be located within the predetermined range from the vehicle, it can be presumed that a person is likely to be present in the building. The vehicle control system 201 of the third embodiment thus determines if a building can be found within the predetermined range from the current location of the vehicle to determine if a person is present within the predetermined range.

When a building is found to be located within the predetermined range, the notification volume is set lower than when no building is found. Thereby, the person presumed to be present in the building is prevented from being unduly annoyed by the notification. Further, when no building is found within the predetermined range, the notification volume is set to be higher than when a building is found. As a result, the emergency situation can be notified to a farther range from the vehicle so that the pedestrians or other persons who may be present farther away from the vehicle than the predetermined distance will have a better chance of knowing the existence of the emergency situation, and the chance of rescue of the driver of the vehicle can be increased.

In addition, as opposed to the first embodiment, the present embodiment does not require a complex process such as image processing for detecting a person so that the configuration of the vehicle control system can be simplified.

Fourth Embodiment

The vehicle control system 301 according to a fourth embodiment differs from the vehicle control system 1 of the first embodiment in that step ST41 is executed instead of step ST14 in the notification process, and step ST44 is executed instead of step ST15. However, the fourth embodiment is otherwise not different from the first embodiment. Therefore, only steps ST41 to ST46 are described in detail, and other parts of the vehicle control system 301 are omitted from the following description.

In step ST41, the action plan unit 42 acquires the number of occupants in the vehicle according to the monitoring result of the occupant monitoring device 11, and determines if the number of fellow occupants is one or more. The fellow occupants here refer to the occupants of the vehicle excluding the driver. More specifically, the action plan unit 42 acquires the image captured by the internal camera 26, and performs a per se known image analysis by applying, for example, deep learning on the acquired image to detect occupants. Thereafter, by counting the detected fellow occupants, the action plan unit 42 acquires the number of fellow occupants. When the acquired number of occupants is one or more, the action plan unit 42 executes step ST42. When the acquired number of occupants is less than one, or in other words, zero, step ST43 is executed.

In step ST42, the action plan unit 42 instructs the external notification control unit 64 to set the volume of the horn 14c to the first notification volume. When the instruction is completed, the action plan unit 42 executes step ST15.

In step ST43, the action plan unit 42 instructs the external notification control unit 64 to set the volume of the horn 14c to the second notification volume higher than the first notification volume. When the instruction is completed, the action plan unit 42 executes step ST15.

In step ST44, the action plan unit 42 executes a determination process similar to that of step ST41. When the acquired number of fellow occupants is one or more, step ST45 is executed, and when the acquired number of occupants is less than one, or in other words zero, step ST46 is executed.

In step ST45, the action plan unit 42 instructs the external notification control unit 64 to set the volume of the horn 14c to the third notification volume. The third notification volume is higher than the second notification volume (alternatively, may be equal to or lower than the second notification volume). When the instruction is completed, the action plan unit 42 executes step ST15.

In step ST46, the action plan unit 42 instructs the external notification control unit 64 to set the volume of the horn 14c to a fourth notification volume that is higher than the third notification volume. When the instruction is completed, the action plan unit 42 executes step ST15. In step ST15, the horn 14c is sounded at the selected notification volume.

The mode of operation of the thus configured vehicle control system 301 is discussed in the following. The vehicle control system 301 of the fourth embodiment acquires the number of fellow occupants of the vehicle by using the occupant monitoring device 11 after determining if a person is present within the predetermined range from the vehicle. When a person is found to be present within the predetermined range from the vehicle, it is determined if the number of fellow occupants of the vehicle is one or more according to the acquisition result (ST41). When the acquired number of occupants is one or more, the action plan unit 42 sets the notification volume to the first notification volume (ST42). When there is no fellow occupant, the action plan unit 42 sets the notification volume to the second notification volume (ST43). When no person is found to be present within the predetermined range from the vehicle, it is determined if the number of fellow occupants of the vehicle is one or more according to the result obtained by the occupant monitoring device 11 (ST44). When the number of fellow occupants is one or more, the action plan unit 42 sets the notification volume to the third notification volume (ST45). When there is no fellow occupant, the action plan unit 42 sets the notification volume to the fourth notification volume (ST46).

The advantages of the vehicle control system 301 of the fourth embodiment are discussed in the following. When the number of fellow occupants of the vehicle is less than one, only the driver is in the vehicle, and there is no other person on board the vehicle to take over the driving or rescue the driver. Therefore, when the number of fellow occupants of the vehicle is less than one, the notification volume is set to the second notification volume (or the fourth notification volume), whereas when the number of fellow occupants of the vehicle is one or more, the notification volume is set to the first notification volume (or the third notification volume). Thus, when there is no other person on board the vehicle to take over the driving or rescue the driver, the notification volume is set to be higher than when there is at least one fellow occupant capable of taking over or rescuing the driver on board the vehicle. When there is no fellow occupant capable of taking over or rescuing the driver in the vehicle, a rescue effort from outside of the vehicle is necessary so that the notification volume is set to be higher than when at least one fellow occupant is on board the vehicle. As a result, a pedestrian or the like who may present outside the vehicle will have a better chance of becoming aware of situation, and the chance of the driver being rescued without delay can be increased.

In the present embodiment, after determining if a person is present within the predetermined range from the vehicle, it is determined if there is any fellow occupant. However, in another embodiment, it is determined if the number of occupants of the vehicle is one or more after determining whether or not the building exists within the predetermined range from the vehicle. In other words, the third embodiment and the fourth embodiment may be combined for better effect.

Fifth Embodiment

The vehicle control system 401 according to a fifth embodiment of the present invention differs from the vehicle control system 301 of the fourth embodiment in that step ST51 is executed instead of step ST41, and step ST52 is executed instead of step ST44 in the notification process. However, other parts are the same as in the fourth embodiment. Only step ST51 and step ST52 are described in the following, and the other parts are omitted from the description.

In step ST51, the action plan unit 42 receives the monitoring result of the occupant monitoring device 11, and acquires the number of children on board the vehicle according to the received monitoring result. More specifically, the action plan unit 42 searches for areas where faces are detected from the image captured by the internal camera 26, and determines an area corresponding to each of the detected faces (face areas). Next, the action plan unit 42 extracts feature points such as eyes, mouth, nose and chin from each face area. Thereafter, the action plan unit 42 estimates the age of the fellow occupant (the owner of the face) using a per se known algorithm for each face area according to the image and the feature points of the face area, and acquires the number of children on board the vehicle. At this time, when the estimated age is 6 years or less, the action plan unit 42 may determine that the corresponding occupant is a child. The action plan unit 42 executes step ST42 when the number of the acquired children is less than one, or in other words, zero, and executes step ST43 when the number of the acquired children is one or more.

In step ST52, the action plan unit 42 executes a determination process similar to step ST51. The action plan unit 42 executes step ST45 when the number of acquired children is less than one, or in other words, zero, and executes step ST46 when the number of the acquired children is one or more.

The mode of operation of the thus configured vehicle control system 401 of the fifth embodiment is discussed in the following. The vehicle control system 401 acquires the number of children on board the vehicle by using the occupant monitoring device 11 after determining if a person is present within the predetermined range from the vehicle. When a person is present within a predetermined range from the vehicle, it is determined if the number of children on board the vehicle is one or more according to the acquisition result (ST51). When the number of acquired children is zero, the action plan unit 42 sets the notification volume to the first notification volume (ST42). When the number of children is one or more, the action plan unit 42 sets the notification volume to the second notification volume (ST43). When no person is present within the predetermined range from the vehicle (ST52), it is determined if the number of children on board the vehicle is one or more according to the result obtained by the occupant monitoring device 11 (ST52). When the number of acquired children is zero, the action plan unit 42 sets the notification volume to the third notification volume (ST45). When the number of children is one or more, the action plan unit 42 sets the notification volume to the fourth notification volume (ST46).

In the present embodiment, it is determined if the number of children is one or more after determining if a person exists within a predetermined range from the vehicle. However, in another embodiment, it may be determined if the number of children is one or more after determining if a building can be found within the predetermined range from the vehicle. In other words, the third embodiment and the fifth embodiment may be combined for better effect.

The advantages of the vehicle control system 401 of the fifth embodiment are discussed in the following. The notification volume is set to be higher when the number of children on board is one or more than when the number of children on board is zero. Thus, by notifying the surrounding people with an increased notification volume when at least one child is on board the vehicle, the call for help can be amplified so as to correspond to the urgency of the situation. Thus, the chance of the pedestrians or the like present outside the vehicle will be made aware of the urgency of the situation more quickly, and the chance of rescuing the child or children on board the vehicle in a timely fashion can be increased.

The present invention has been described in terms of a specific embodiment, but is not limited by such embodiment, but can be modified in various ways without departing from the scope of the present invention.

In the foregoing embodiments, the notification volume was set in the notification process, but the present invention is not limited to this mode. More specifically, the notification volume may be set in the stop maintaining process after the vehicle has come to a stop in the stop process.

In the above-described embodiments, the setting of the notification volume was performed in dependence on the presence of surrounding persons within the prescribed range, the presence of objects moving at a speed equal to or higher than a predetermined value, the presence of a building within the prescribed range, the number of fellow occupants, or the number of children on board the vehicle. Alternatively or additionally, the notification volume may be changed according to the driver's health condition.

Further, in the stop maintaining process, the notification volume may be set lower, from the second notification volume to the first notification volume, for instance, when the external camera 19 detects that an emergency vehicle or a person is approaching the vehicle. The people approaching the vehicle to rescue the driver is prevented from being annoyed or distracted by an excessive loud acoustic notification.

The action plan unit 42 may change the notification volume according to the place where the stop area is selected. For example, when the stop area is set to a place where the number of people present is expected to be large (for example, a parking area), the notification volume may be set lower, from the second notification volume to the first notification volume, for instance, as compared to the case of an area where the number of people present are expected to be small (for example, the emergency parking zone).

Also, the action plan unit 42 may set the notification volume to be higher with the distance to the detected building. For instance, the notification volume may be increased in proportion to the distance to the building, for instance.

The invention claimed is:

1. A vehicle control system configured for autonomous driving, comprising:
   a control unit for steering, accelerating, and decelerating a vehicle;
   a surrounding condition acquiring unit configured to acquire a surrounding condition of the vehicle; and
   an external notification device configured to generate an acoustic notification at a first notification volume and the acoustic notification at a second notification volume higher than the first notification volume to a surrounding part of the vehicle;
   wherein the control unit is configured to execute a stop process by which the vehicle is parked in a prescribed stop area when it is detected at least one of that an input operation is not applied to a driving operation device and that a surrounding environment of the vehicle is not monitored by the driver,
   wherein the control unit is configured to determine if a person is present within a predetermined range from the vehicle according to information obtained by the surrounding condition acquiring unit, the control unit causing the external notification device to generate the acoustic notification at the first notification volume when a person is present within the predetermined range, and at the second notification volume when a person is not present within the predetermined range, and
   wherein the control unit is configured to end the stop process and the emission of the acoustic notification when an input operation is applied to the driving operation device by an operation amount equal to or greater than a predetermined threshold.

2. The vehicle control system according to claim 1, wherein the surrounding condition acquiring unit comprises an external camera configured to capture a view outside of the vehicle.

3. The vehicle control system according to claim 1, wherein the control unit is configured to determine a presence or an absence of an object that moves at a speed equal to or higher than a predetermined value within a predetermined range from the vehicle according to a surrounding condition acquired by the surrounding condition acquiring unit, the control unit determining a presence of a person when an object moving at a speed equal to or higher than the predetermined value within the predetermined range from the vehicle is detected, and an absence of a person when an object moving at a speed equal to or higher than the predetermined value within the predetermined range from the vehicle is not detected.

4. The vehicle control system according to claim 1, wherein the surrounding condition acquiring unit further includes a navigation device that retains map information, and is configured to identify a position of the vehicle, and the control unit is configured to acquire a presence or an absence of a building located within a predetermined range from the vehicle according to the position of the vehicle identified by the navigation device and the map information, the control unit determining the presence of a person when the presence of a building within the predetermined range is acquired, and the absence of a person when the absence of a building within the predetermined range is acquired.

5. The vehicle control system according to claim 1, further comprising an occupant monitoring device for monitoring an occupant of the vehicle,
   wherein the external notification device is configured to emit the acoustic notification at a third notification volume greater than the second notification volume and a fourth notification volume greater than the third notification volume, in addition to at the first notification volume and the second notification volume, and
   the control unit is configured to determine if a person is present within the predetermined range from the vehicle according to information acquired by the surrounding condition acquiring unit,
   to determine a number of fellow occupants in the vehicle according to information acquired by the occupant monitoring device,
   to cause the acoustic notification to be emitted at the first notification volume when a person is present within the predetermined range from the vehicle and at least one fellow occupant is on board the vehicle,
   to cause the acoustic notification to be emitted at the second notification volume when a person is present within the predetermined range from the vehicle and no fellow occupant is on board the vehicle,
   to cause the acoustic notification to be emitted at the third notification volume when no person is present within the predetermined range from the vehicle and at least one fellow occupant is on board the vehicle, and
   to cause the acoustic notification to be emitted at the fourth notification volume when no person is present within the predetermined range from the vehicle and no fellow occupant is on board the vehicle.

6. The vehicle control system according to claim 1, further comprising an occupant monitoring device for monitoring an occupant of the vehicle,
   wherein the external notification device is configured to emit the acoustic notification at a third notification volume greater than the second notification volume and a fourth notification volume greater than the third notification volume, in addition to at the first notification volume and the second notification volume, and
   the control unit is configured to determine if a person is present within the predetermined range from the vehicle according to information acquired by the surrounding condition acquiring unit,
   to determine a number of children in the vehicle according to information acquired by the occupant monitoring device,
   to cause the acoustic notification to be emitted at the first notification volume when a person is present within the predetermined range from the vehicle and no child is on board the vehicle,
   to cause the acoustic notification to be emitted at the second notification volume when a person is present within the predetermined range from the vehicle and at least one child is on board the vehicle,
   to cause the acoustic notification to be emitted at the third notification volume when no person is present within the predetermined range from the vehicle and no child is on board the vehicle, and
   to cause the acoustic notification to be emitted at the fourth notification volume when no person is present within the predetermined range from the vehicle and at least one child is on board the vehicle.

7. The vehicle control system according to claim 1, wherein the external notification device is configured to emit the acoustic notification rearward, leftward and/or rightward, in addition to emitting the acoustic notification forward.

8. The vehicle control system according to claim 1, wherein the control unit is configured to continue to emit the acoustic notification with the external notification device even after the vehicle stops at a stop position and is configured to end the emission of the acoustic notification when it detects that the input operation is applied to the driving operation device.

9. The vehicle control system according to claim 1 further comprising an occupant monitoring device for monitoring an occupant of the vehicle,
   wherein the control unit is configured to notify a driver of a handover request based on a monitoring result obtained by the occupant monitoring device,
   wherein the control unit is configured to determine that the driver is in an abnormal state or condition where the control unit or the driver has become incapable of properly maintaining a traveling state of the vehicle, when no input by the driver via the occupant monitoring device to the handover request is detected,
   wherein the control unit is configured to execute a stop process by which the vehicle is parked in a prescribed stop area when it is determined that the driver is in the abnormal state or condition.

* * * * *